United States Patent [19]

Boudreau et al.

[11] Patent Number: 5,420,953

[45] Date of Patent: May 30, 1995

[54] OPTOELECTRONIC INTEGRATION OF HOLOGRAMS USING (110) ORIENTED SILICON ON (100) ORIENTED SILICON WAFERBOARD

[75] Inventors: Robert A. Boudreau, Hummelstown; Hongtao Han, Mechanicsburg; John R. Rowlette, Sr., Hummelstown, all of Pa.; Jared D. Stack, Charlotte, N.C.

[73] Assignee: The Whitaker Corporation, Wilmington, Del.

[21] Appl. No.: 198,028

[22] Filed: Feb. 17, 1994

[51] Int. Cl.6 ............................................. G02B 6/36
[52] U.S. Cl. ................................... 385/88; 385/89; 385/49; 385/33
[58] Field of Search .................. 385/14, 33, 34, 35, 385/49, 88, 89, 90, 91, 92, 93, 94

[56] References Cited

U.S. PATENT DOCUMENTS

| | | | |
|---|---|---|---|
| 4,210,923 | 7/1980 | North et al. | 357/30 |
| 4,376,946 | 3/1983 | Kaminow et al. | 357/17 |
| 4,466,696 | 8/1984 | Carney | 350/96.20 |
| 4,562,632 | 1/1986 | Parchet et al. | 29/281.1 |
| 4,595,454 | 6/1986 | Dautremont-Smith et al. | 156/647 |
| 4,762,382 | 8/1988 | Husain et al. | 350/96.12 |
| 4,779,946 | 10/1988 | Pimpinella et al. | 350/96.20 |
| 4,897,711 | 1/1990 | Blonder et al. | 357/74 |
| 5,011,247 | 4/1991 | Boudreau et al. | 350/96.2 |
| 5,015,059 | 5/1991 | Booth et al. | 350/96.17 |
| 5,073,003 | 12/1991 | Clark | 385/33 |
| 5,077,878 | 1/1992 | Armiento et al. | 29/25.02 |
| 5,123,073 | 6/1992 | Pimpinella | 385/59 |
| 5,163,108 | 11/1992 | Armiento et al. | 385/89 |
| 5,173,959 | 12/1992 | Cambriello | 385/89 |
| 5,182,782 | 1/1993 | Tabasky et al. | 385/89 |
| 5,202,775 | 4/1993 | Feldman et al. | 359/11 |
| 5,224,184 | 6/1993 | Boudreau | 385/35 |
| 5,257,332 | 10/1993 | Pimpinella | 385/59 |

FOREIGN PATENT DOCUMENTS

| | | | |
|---|---|---|---|
| 2426271 | 12/1979 | France | 385/49 |
| 56-54081 | 5/1981 | Japan | 385/49 |
| 94305 | 4/1989 | Japan | 385/49 |

OTHER PUBLICATIONS

IEEE Transactions on Components, Hybrids, and Manufacturing Technology, vol. 15, No. 6, Dec. 1992—*Gigabit Transmitter Array Modules on Silicon Waferboard*—Craig A. Armiento, et al.

Primary Examiner—John Ngo
Attorney, Agent, or Firm—William S. Francos

[57] ABSTRACT

The disclosure describes an optical interconnect which utilizes a silicon waferboard (1) with grooves (3,4) etched to expose preferred crystallographic planes to effect alignment of focusing elements (5) between optical waveguides (6) and optoelectronic devices (2). The focusing elements (5) are made of silicon wafers and are etched to expose crystal planes which compliment crystal planes of cavities or grooves which are etched in the waferboard. The focusing elements may have holograms (7) formed thereon for efficient focusing to the optical waveguide (6).

18 Claims, 3 Drawing Sheets

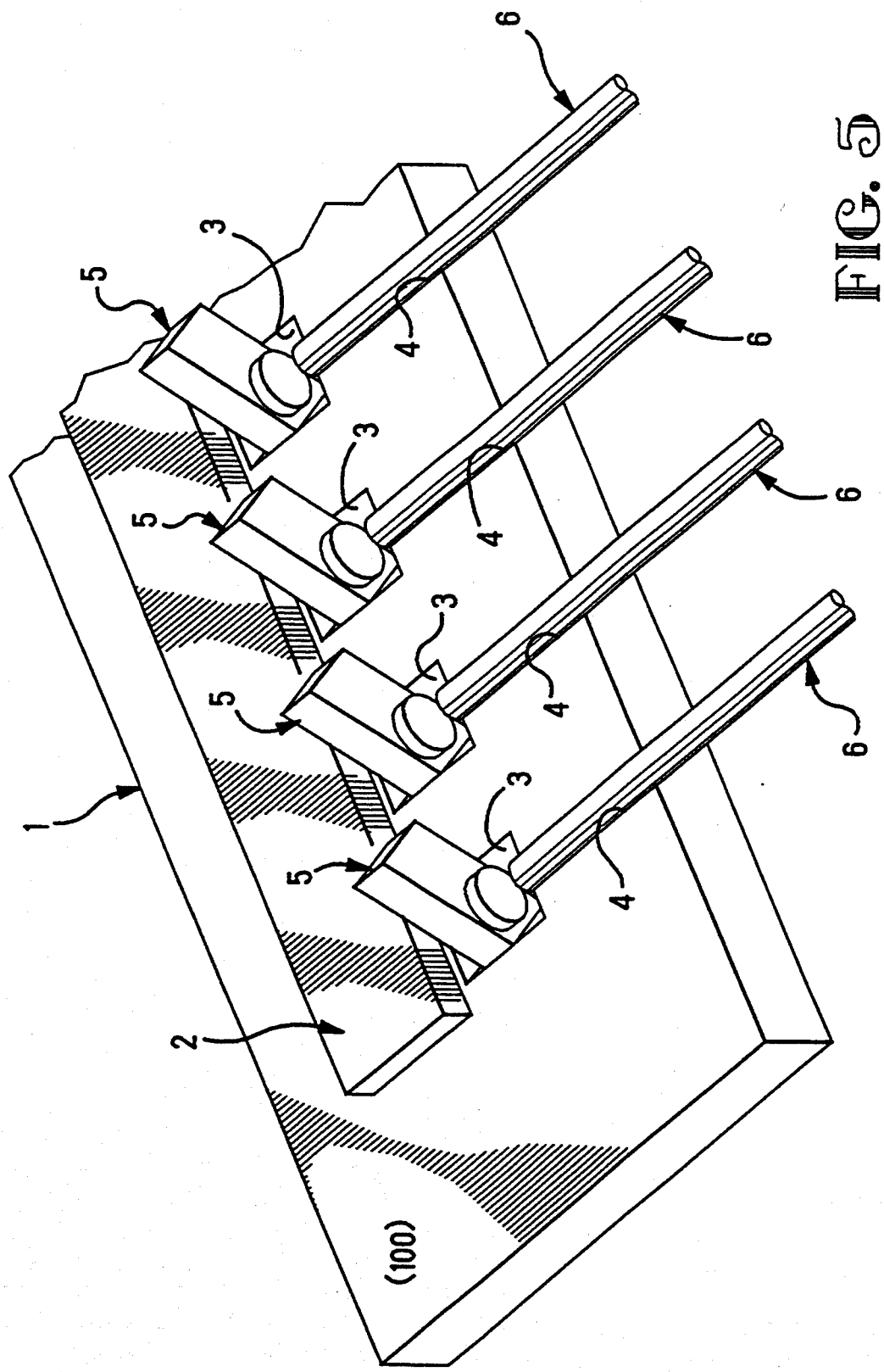

OPTOELECTRONIC INTEGRATION OF HOLOGRAMS USING (110) ORIENTED SILICON ON (100) ORIENTED SILICON WAFERBOARD

FIELD OF INVENTION

The invention relates to the coupling of an optoelectronic device to an optical fiber, and more particularly, to the use of a holographic optical element to effect coupling of a device and fiber mounted on a silicon substrate.

BACKGROUND OF THE INVENTION

Optical communications afford a highly efficient method of information transmission, particularly in high speed digital and analog transmission of information. The emergence of active optoelectronic devices heighten this efficient method of data transmission. There are attendant difficulties in effecting lightwave communications, not the least of which is inefficient coupling of a waveguide to an active device.

One source of inefficient coupling is misalignment of the fiber to the device. The emergence of silicon waferboard technology has provided means to accurately align optical fibers in a passive manner. As disclosed for example in U.S. Pat. Nos. 5,224,784; 5,163,108; 5,077,878 and 5,182,782, by etching along preferred crystallographic planes in a silicon waferboard, "V" grooves are formed for accurate passive alignment of optical fibers with active devices and or coupling fibers. One example of the use of crystallographic planes in the alignment of an optoelectronic device to a fiber using a silicon substrate is disclosed in U.S. Pat. No. 4,210,923 to North, et al. In '923, an $SiO_2$ mask is applied to a silicon substrate having a major surface in the (110) crystal orientation. By application of KOH solution and water, anisotropic etching is achieved and V grooves are formed with sidewalls in the (111) crystalline planes. As further discussed in North, et al. the precise depth of the V groove can be made by picking the requisite width of the groove. Thereby, due to the known characteristic relative angles of the crystallographic planes, the accurate passive alignment of the optical fiber to the optoelectronic device is achieved. An electro-optic detector is grown on the substrate via conventional methods and light from the fiber is coupled to the edge receiving detector. North, et al. has no provision for focusing the incoming light from the fiber to the active device. Accordingly, there are attendant problems with back-reflections as well as inadequate coupling of the light due to this inability to properly focus. Other examples of masking and etching monocrystalline silicon to reveal, at desired locations grooves and/or apertures with side walls in preferred crystallographic planes are disclosed in U.S. Pat. Nos. 4,897,711; 4,779,946 and 4,466,696, incorporated herein by reference. These references disclose the use of various etching techniques to create alignment grooves to increase the coupling efficiency of light between optical fibers and between a fiber and a device.

In U.S. Pat. No. 4,897,711, the use of a focusing member is disclosed. In this reference, a top emitting LED is mounted on a substrate. A second piece of silicon is etched and a reflecting surface formed thereon to couple light from the LED to a fiber mounted in a V groove. A lens is mounted in an anisotropically etched pyramidal hole in an intermediate silicon piece to focus the light from the LED to the fiber. U.S. Pat. No. 5,073,003 teaches a structure similar to the '711 patent but further aligns the LED by crystallographic etching to effect coupling of light to the fiber with approximately a zero degree angle of incidence. U.S. Pat. No. 5,224,184 to Boudreau describes the use of a waferboard substrate which has mounted thereon a semiconductor device, a planar optical waveguide and a focusing element therebetween. The focusing element in this case is a geometrical or GRIN lens which is placed in a relief (to include a "V" shaped cavity) in the substrate and focuses light between the device and the waveguide. The lens has mounted thereon a handle for aligning the lens to properly focus between transmit and receive ports. Thereby the positioning of the lens requires active alignment between optical ports. After alignment the lens is secured by various techniques including soldering and welding. Finally, U.S. Pat. No. 5,123,073 to Pimpinella describes the use of inverted pyramid-shaped wells which hold lens spheres that effect focusing between coaxially aligned fibers set in "v" grooves. The invention requires the use of a two part housing and cylinders for mechanical alignment.

It is desirable to be able to accurately couple light between an optoelectronic device and a fiber with high coupling efficiency and thereby high signal power transfer. To this end, it is an object of this invention to be able to provide a high precision, efficient optical interconnection between fibers and optical devices by passive alignment of a focusing element. This passive alignment is achieved with great accuracy by employing the characteristic crystalline planes of crystalline materials such as silicon in both the substrate and the substrate that forms the focusing element.

BRIEF DESCRIPTION OF THE DRAWINGS

FIG. 5 shows an array of focusing elements to couple an optoelectronic array with an array of fibers.

SUMMARY OF THE INVENTION

This and other objects are achieved in accordance with this invention. Fiber optic waveguides are passively aligned in a monocrystalline silicon substrate by etching v-grooves in the substrate that hold the fibers. Inverted pyramidal cavities are also etched into the substrate so as to receive a complementary shaped focusing element. The focusing elements are vertically aligned to accurately and efficiently couple light between the fibers and the devices, but this coupling arrangement could be used to couple light between fibers. The focusing element is a monocrystalline wafer etched on its sides to fit into the complementary cavity thereby effectively aligning the focusing element between the fiber and the device.

DETAILED DESCRIPTION

For the purposes of illustration, emphasis will be made herein on particular optical coupling assemblies made of silicon. The major advantages of using the defined crystallographic planes etched to provide proper alignment of optical pieces is the focus of the invention. The standard semiconductor processing techniques to effect fabrication are well known in the art and therefore emphasis will not be so disposed on the techniques of fabrication.

Figure 1:
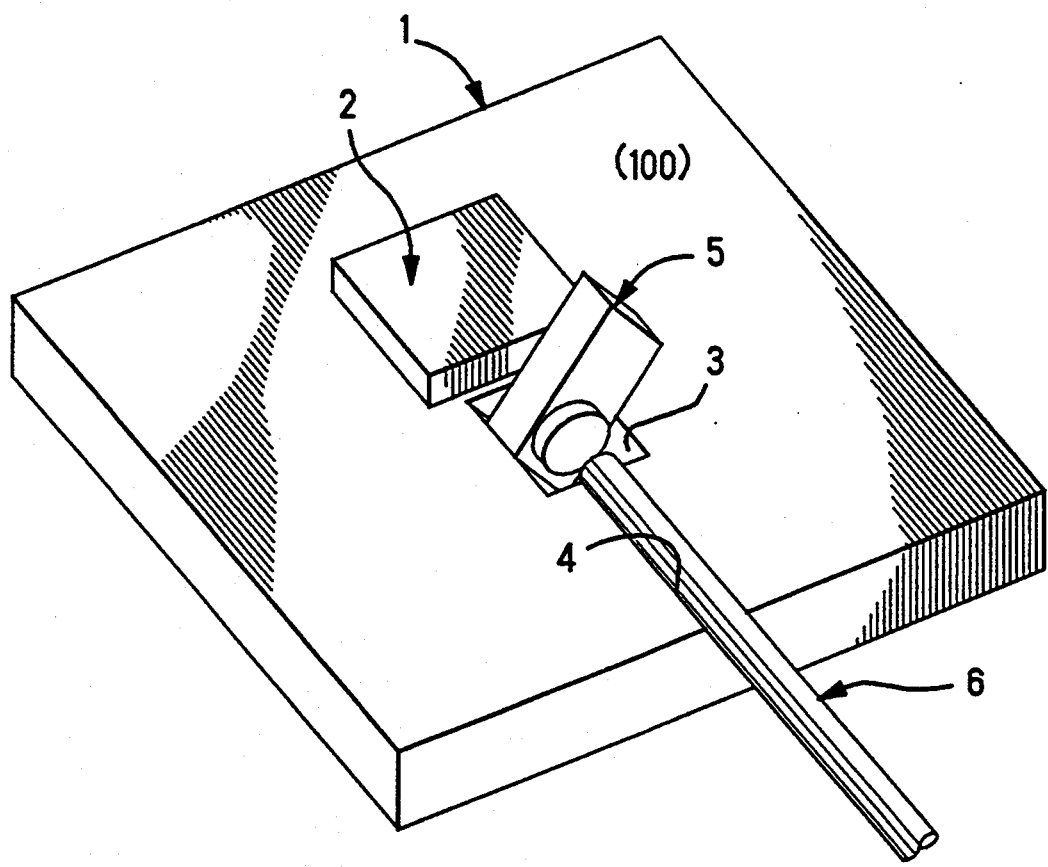
FIG. 1 shows an overall view of the coupling apparatus with focusing element 5 inserted into cavity 3 so as to optically align optoelectronic device 2 with optical fiber 6.

Referring now to FIG. 1, a crystalline substrate 1 such as silicon with a top surface in (100) plane has mounted thereon an optoelectronic device 2. While the optoelectronic device as shown is a discrete element, because the substrate is made of silicon, it is clear that a device could be fabricated on the substrate by epitaxial growth and doping techniques well known in the art. By using (100) oriented silicon, etching will provide inverted pyramidal shaped cavities 3 and "v"-shaped grooves 4 for receiving focusing elements 5 and optical waveguides 6, respectively. Focusing elements 5 are made of (110) oriented silicon and are etched on their sides to fit in the cavities 3. This fabrication of the alignment feature of the focusing element will be described in further detail below.

Figure 2:
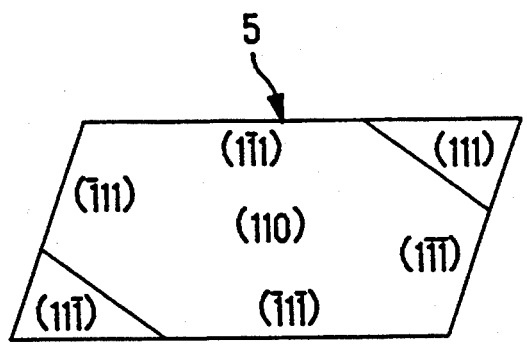
FIG. 2 shows the lines of orientation of the characteristic planes of (110) silicon.
Figure 3:
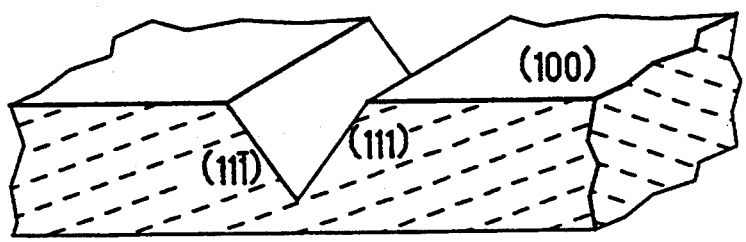
FIG. 3 shows the three-dimensional view of the (111) planes etched into the (100) oriented silicon.
Figure 4:
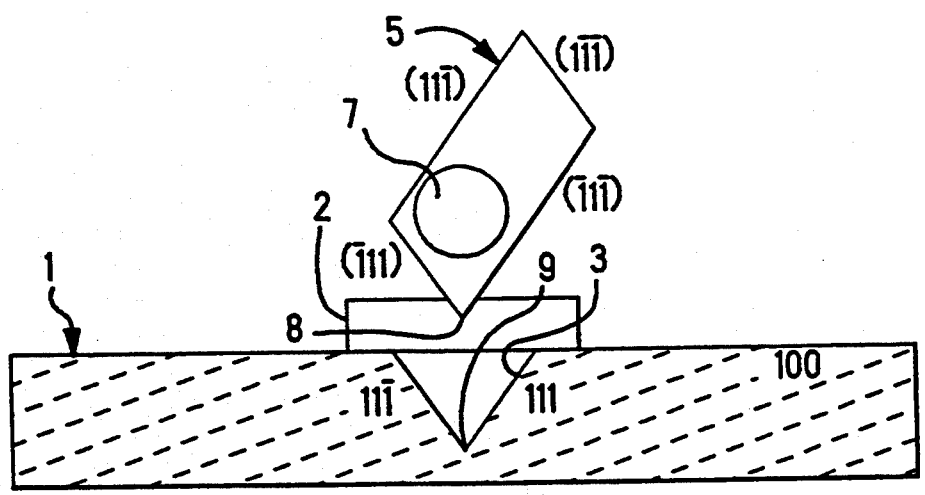
FIG. 4 shows the alignment of the diamond shaped focusing element with hologram formed thereon to be inserted into the cavity formed in the substrate.

To understand how accurate passive alignment of the focusing elements is achieved, we turn to FIGS. 2 and 3, which show the preferred crystallographic planes of silicon. By etching by standard techniques, V-grooves with sidewalls in the (111) planes are exposed. As is seen in FIG. 3, etching the (100) substrate reveals the sidewalls in the (111) and (111) planes forming an included angle of 70.5 therebetween. In using (100) oriented silicon wafers, the wafer is photolithographically masked by applying masks with openings aligned to crystallographic planes. To this end, masking materials such as silicon nitride, silicon dioxide or special polymer materials are grown, deposited or spin coated on the substrate. Next a photoresist is applied to the top of the masking material by spin coating, followed by photolithographically defining and patterning the photoresist layer. Then the photoresist patterns are transferred to the masking material by wet an dry etching techniques. Finally, an anisotropic etchant is applied and the unmasked (100) surfaces etch rapidly until the (111) family of crystal planes is revealed. Typical anisotropic etchants are KOH, ammonium hydroxide, tetramethyl ammonium hydroxide, hydrazine and ethylenediamine-pyrocatechol-water. The revealed crystal planes etch so slowly that the etching process automatically ceases leaving mechanical features that are controlled by mask dimensions. Etching in this crystal orientation is known to be a self-limiting process and the depth of the groove is directly proportional to the width of the mask opening. For further description of this phenomena see U.S. Pat. No. 4,210,923, incorporated by reference. As is seen in FIG. 1 the cavities 3 and the v-grooves 4 are etched with differing width masks and are thereby of differing depths. The deeper cavities are wider to allow the focusing element to capture the expanded beam of the laser and focus the beam down to a useful spot size at the entrance of the fiber. The v-groove is of the depth needed to adequately align the fiber with the optical beam. For example using a 125 micron diameter fiber, a v-groove depth in the range of 50-75 microns is exemplary. Turning to FIG. 4, we see how the use of the complementary nature of the sides of the focusing element with the sidewalls of the cavity 3 allows the focusing member 5 to be accurately positioned in the cavity. Thereby hologram 7 is in direct alignment with the optoelectronic device formed or mounted on the surface of substrate 1 and the fiber 6 as is seen in FIG. 1.

Turning now to the fabrication of the focusing element to effect passive, to effect accurate alignment of the focusing element between the optoelectronic device and the fiber waveguide, a mask with an array of island shaped parallelograms with compensation structures at four corners, is used to control the corner undercut during the anisotropic etching. The mask parallelogram is of an orientation as shown in FIG. 2. This anisotropic etching, which is similar in technique to that described in the fabrication of v-grooves effects the dicing of the focusing elements from (110) oriented crystalline silicon. As we see in FIG. 2, by using a proper etching technique, the focusing element is formed to have dimensions which complement the cavity in the waferboard substrate. To this end, as is best shown in FIG. 4, by choosing the (110) wafer for the focusing element and etching the sides to reveal the (111) family of planes, the corner of the diamond shaped focusing element is 70.5. This is precisely the included angle of the cavity in the (100) waferboard substrate. The fit is made with great precision, since the depth of the cavities and v-grooves in the substrate and the length of the sides of the focusing can be precisely defined by proper masking and etch rates. It is clear that precise, passive alignment of the focusing element between the optoelectronic device and the fiber is achieved by the use of the characteristic crystal planes revealed by etching. In this case the use was made of a (100) substrate and a (110) wafer for the focusing element.

By employing known etching techniques to reveal the desired characteristic planes on both the sides of the focusing element and the sides of the cavity in the substrate, accurate, passive alignment is achieved. For example, as is seen in FIG. 2, by etching a (110) silicon wafer, sides 1 and 2 in the (111) and (111) planes respectively are exposed with an included angle of 70.5. This produces the diamond-shaped focusing element as best seen in FIG. 4. The (100) substrate is then etched to reveal a cavity with side walls in the (111) and (111) with an included angle of 70.5. Thus, turning to FIG. 4, we see that the corner 8 of the focusing element 5 fits into the corner 9 of the cavity in the waferboard substrate 1. Clearly, it is the complementary nature of the revealed planes that make this alignment possible, and accordingly, the use of other crystal orientations to achieve alignment are within the scope of the invention. Finally, as seen in FIG. 4, the focusing element 5 is mounted vertically from the top of the waferboard substrate 1. This allows edge emitting lasers to be focused on a fiber without having to pass the light emissions up out of the plane of emission to another silicon layer. Again, the alignment of the crystal planes of the cavities and the focusing elements provide for excellent vertical alignment of the focusing element between the device and the fiber or two fibers.

Turning again to FIG. 1, the focusing element 5 contains a focusing member to include a for example a hologram. One way to dispose a hologram on the focusing member is to form it directly on the silicon wafer by the Radially Symmetric Iterative Discrete On-Axis (RSIDO) encoding method. This technique boasts diffraction efficiencies of 85%-95% as opposed to previous encoding schemes which achieve only 60% efficiencies. Furthermore, the holograms are capable of accurate focusing at multiple focal lengths as well as wavelength independent focal lengths. For a more complete description of the RSIDO method, see U.S. Pat. No. 5,202,775 to Feldman, et al, incorporated herein by reference. In the present invention, a silicon substrate is chosen with a (110) orientation for the focusing element. An amorphous layer of $SiO_2$ is deposited by chemical vapor deposition (CVD) or other deposition techniques known in the art. Thereby a surface is created that does not etch anisotropically. Thereafter, a photoresist is spin coated on to a chrome-on-quartz substrate. The pattern is determined from the output of an encoding scheme such as RSIDO which gives a high diffraction efficiency. The pattern is selectively etched in the chrome film to form a mask. These steps are repeated to create eight phase levels. Next, a photoresist is spin coated on the amorphous silicon layer, and UV radiation is used to illuminate the mask. The mask is imaged onto the resist to expose the photoresist using, for example a 5× reduction. The resist is then developed to create the pattern in the amorphous layer. The amorphous layer is then reactive ion etched to create the appropriate phase depths. The process is repeated with other masks for additional phase steps.

Another embodiment of this invention can be seen in FIG. 5. As is seen in this embodiment, the masking and etching of the substrate accomplishes an array of cavities and v-grooves in parallel. The pitch spacing of the v-grooves is chosen to maximize the number of fiber optic waveguides in a given area of silicon substrate. Picking fiber with 125 micrometer diameter, the pitch spacing of the v-grooves can be chosen as close as 250 microns. As was discussed previously, the groove width and depth are interdependent. The pitch spacing of the v-grooves and cavities is thereby limited only by the required depths of the cavities and v-grooves necessary to effect alignment of the optoelectronic device(s) with the fiber(s). In this arrangement, a single receiver/transmitter array can be mounted or formed on the substrate in accurate alignment with the focusing elements and fiber array. Alternatively, discrete devices could be mounted or formed on the substrate.

Various additional modifications will become apparent to those of ordinary skill in the art. All such variations which basically rely on the teachings which this invention advances in the art are considered within the scope of the invention.

We claim:

1. An apparatus for coupling an optical beam between an optoelectronic device and an optical waveguide comprising:
    (a.) A silicon substrate having a selected thickness, a top surface oriented in the (100) crystallographic plane and a bottom surface substantially parallel to said top surface;
    (b.) A substantially v-shaped groove etched in said top surface having sidewalls oriented in the (111) crystallographic planes for receiving an optical waveguide;
    (c.) A substantially v-shaped cavity etched in said top surface having sidewalls oriented in the (111) crystallographic planes and having a first end in communication with said groove and a second end in communication with the optoelectronic device; and a silicon substrate wafer mounted in said cavity having top and bottom surfaces and substantially parallel side surfaces etched to expose (111) crystallographic planes, and means for focusing the optical beam between the optoelectronic device and the optical waveguide, said means for focusing contained in said wafer, whereby said means for focusing the optical beam is passively aligned between the optoelectronic device and the waveguide.

2. An apparatus as set forth in claim 1, wherein said means for focusing the optical beam is hologram formed on said silicon substrate wafer.

3. An apparatus for coupling optical beams between optoelectronic devices and optical waveguides comprising:
    (a.) A substrate having a selected thickness between top and bottom surfaces;
    (b.) At least one optoelectronic device mounted on said top surface;
    (c.) A plurality of substantially parallel grooves etched into said top surface, each of said grooves having an optical waveguide mounted therein;
    (d.) A plurality of cavities etched into said top surface, each of said cavities having a first end in communication with one of said grooves and a second end adjacent said optoelectronic device; and a plurality of silicon substrate wafers focusing elements, one of said silicon substrate wafer focusing elements mounted in each of said cavities, whereby the optical beams emitted from or impingent on said optoelectronic device is transmitted through one of each of said optical waveguides and focused by one of each of said silicon substrate wafer focusing elements.

4. An apparatus as set forth in claim 3, wherein said substrate is made of silicon.

5. An apparatus as set forth in claim 4, wherein said top surface is of (100) crystallographic orientation.

6. An apparatus as set forth in claim 5, wherein said grooves and said cavities are substantially "v"-shaped having sidewalls oriented in the (111) crystallographic planes.

7. An apparatus as set forth in claim 3, wherein said silicon substrate wafer focusing elements are oriented in the (110) crystallographic direction having means for focusing the optical beam mounted in or formed on said focusing element.

8. An apparatus as set forth in claim 7, wherein said silicon substrate wafers are of a selected thickness between top and bottom surfaces having substantially parallel side surfaces etched to expose (111) crystallographic planes.

9. An apparatus as set forth in claim 7, wherein said means for focusing further comprises a hologram generated on said focusing element.

10. An apparatus for coupling an optical beams between optoelectronic devices and optical waveguides comprising:
    (a.) A silicon substrate having a selected thickness, a top surface oriented in the (100) crystallographic plane and a bottom surface substantially parallel to said top surface;
    (b.) A plurality of substantially parallel v-shaped grooves etched in said top surface having sidewalls oriented in the (111) crystallographic planes for receiving an optical waveguide;
    (c.) A plurality of substantially v-shaped cavities etched in said top surface each of said cavities having sidewalls oriented in the (111) crystallographic planes and each of said cavities having a first end in communication with a respective one of said grooves and a second end in communication with the optoelectronic device; and (d.) A plurality of silicon substrate wafers each of said wafers mounted in a respective one of said cavities, each of said wafers having top and bottom surfaces and substantially parallel side etched to expose (111) crystallographic planes, and means for focusing the optical beams between the optoelectronic devices and the optical waveguides, said means for focusing contained in each of said wafers, whereby said means for focusing the optical beams is passively aligned between said optoelectronic device and said waveguides.

11. An apparatus as set forth in claim 10, wherein means for focusing the optical beam is hologram formed on each of said silicon substrate wafers.

12. An apparatus for coupling an optical beam between an optoelectronic device and an optical waveguide, comprising:

a. A substrate having a selected thickness between top and bottom surfaces;
b. An optoelectronic device mounted on said top surface;
c. A groove etched into said top surface having an optical waveguide mounted therein;
d. A cavity etched into said top surface having a first end in communication with said groove and a second end adjacent said optoelectronic device; and
e. A silicon substrate wafer focusing element mounted in said cavity, said silicon substrate wafer focusing element having means for focusing the optical beam, said means for focusing mounted in or formed on said silicon substrate wafer focusing element.

13. An apparatus as recited in claim 12, wherein said substrate is made of silicon.

14. An apparatus as recited in claim 13, wherein said top surface is of (100) crystallographic orientation.

15. An apparatus as recited in claim 14, wherein said groove and said cavity are substantially "V" shaped, having side walls oriented in the (111) crystallographic planes.

16. An apparatus as recited in claim 12, wherein said silicon substrate wafer is oriented in the (110) crystallographic orientation.

17. An apparatus as recited in claim 16, wherein said silicon substrate wafer is of a selected thickness between top and bottom surfaces having substantially parallel side surfaces etched to expose (111) crystallographic planes.

18. An apparatus as recited in claim 16, wherein said means for focusing further comprises a hologram generated on said focusing element.

* * * * *